United States Patent [19]

Tsunemoto et al.

[11] 3,935,972
[45] Feb. 3, 1976

[54] PRESSURE ACTUATED NOZZLE VALVE FOR INJECTION MOLDING UNITS

[75] Inventors: Shiro Tsunemoto, Edosaki; Eiichi Hirayama; Teruki Mizuguchi, both of Azuma, all of Japan

[73] Assignee: Fuji Plastic Co., Ltd., Japan

[22] Filed: Dec. 27, 1974

[21] Appl. No.: 536,863

[30] Foreign Application Priority Data
Dec. 28, 1973 Japan.................................... 49-852

[52] U.S. Cl............ 222/146 HE; 219/536; 222/496; 425/245 NS
[51] Int. Cl.²........................................... B29F 1/03
[58] Field of Search.......... 425/146, 245 R, 245 NS; 219/535, 536, 421; 222/496, 497, 413, 146 HE

[56] References Cited
UNITED STATES PATENTS

| | | | |
|---|---|---|---|
| 3,412,231 | 11/1968 | McElligott..................... | 219/536 X |
| 3,671,162 | 6/1972 | Lohmann........................ | 425/245 R |
| 3,767,340 | 10/1973 | Driscoll et al. ..................... | 425/146 |
| 3,854,631 | 12/1974 | Moen........................... | 222/146 HE |

FOREIGN PATENTS OR APPLICATIONS

| | | | |
|---|---|---|---|
| 1,104,684 | 4/1961 | Germany........................... | 425/245 |

*Primary Examiner*—Robert B. Reeves
*Assistant Examiner*—David A. Scherbel
*Attorney, Agent, or Firm*—Laurence, Stokes & Neilan

[57] ABSTRACT

Provided is an injection unit for the hot runner molding including a heating cylinder having passageways for fused plastic longitudinally formed therethrough and a nozzle member attached to one end of the cylinder and having an injection nozzle. Within the cylinder is fixably disposed a torpedo, which has a central blind hole formed therethrough in a manner spaced from and parallel with said plastic passageways of the cylinder. Within the central blind hole is disposed a spring assembly, which always biases a pin member abutting against the spring assembly. The pin member is provided with a valve and both are integrally operated. Where a prescribed level of plastic pressure acts on the valve, the valve is separated from the nozzle member to permit the plastic to be injected through the injection nozzle. Where the prescribed plastic pressure does not act on the valve, the valve is made to abut the nozzle member by the bias force of the spring assembly to close the injection nozzle.

8 Claims, 5 Drawing Figures

PRESSURE ACTUATED NOZZLE VALVE FOR INJECTION MOLDING UNITS

BACKGROUND OF THE INVENTION

This invention relates to an injection unit for injection molding, and more particularly to an injection unit for the hot runner molding.

Conventionally, for the purpose of maintaining, in the injection molding of plastic, a sprue and runner molded integrally with a plastic molding and disused after released therefrom in a fused condition to attain the effective utilization of plastic, the injection molding method using a hot runner is widely adopted. In the hot runner, there is known the type wherein, for the purpose of maintaining a resin within the runner in a fused condition, cartridge heaters are disposed surrounding the runner; and band heaters are mounted surrounding the nozzle portion of the runner connecting to the gate of the moldings. Such construction, however, has the drawback that a sufficient control can not be made of the plastic injection from the nozzle. For this reason, a large number of injection units adapted to close the injection nozzle using valve means have been proposed. But any of these injection units is complicated in construction and renders it difficult to control the injection with precision.

SUMMARY OF THE INVENTION

The object of the invention is to provide a compact injection unit capable of performing a precise injection control.

For attaining the above object, the injection unit according to the invention includes a heating cylinder having passageways for fused plastic longitudinally formed therethrough and nozzle means having an injection nozzle communicating with plastic passageways of the cylinder and attached to one end of the cylinder. A torpedo having a central blind hole formed therethrough in a manner spaced from and parallel with said plastic passageways is fixably disposed within the cylinder. The injection unit further includes valve means having a pin member slidably disposed within the central blind hole and a valve member connected to the pin member and disposed within the nozzle means. Within the central hole is disposed resilient biasing means to bias the pin member and the valve member. Where a prescribed level of plastic pressure acts on the valve means, the valve member is released, due to the difference in pressure acting upon the valve means, from the injection nozzle to permit the plastic to be injected from the injection nozzle. Where the prescribed level of plastic pressure does not act on the valve means, the valve member is biased by the rosilient biasing means to close the injection nozzle thereby preventing the plastic injection.

Other objects, features and advantages of the invention will become apparent from the following detailed description and the accompanying drawings.

DETAILED DESCRIPTION OF THE PREFERRED EMBODIMENTS

There will now be described a preferred embodiment of the invention by reference to the appended drawings.

Figure 1:
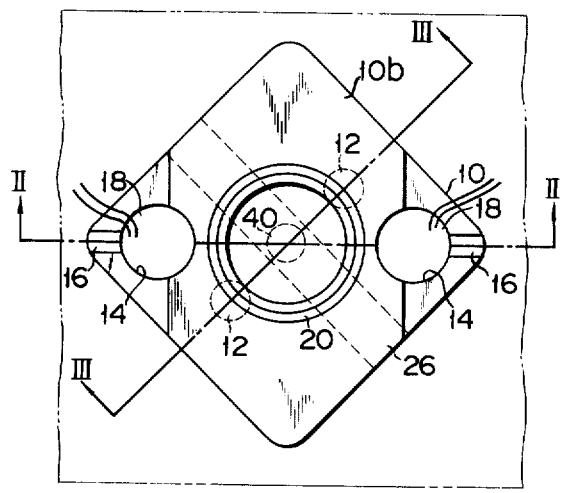
FIG. 1 is a plan view illustrating an embodiment of the invention.

In FIG. 1, a reference numeral 10 denotes a heating cylinder for maintaining plastic in a fused condition. The cylinder 10 has a body section 10a, a base end section 10b being in abutment with a runner plate 1 (not shown) and a tip end section 10c facing a cavity (not shown). Two passageways 12 for fused plastic are formed through the body section 10a in a manner extending to the tip end section 10c and communicate with each other at the base end section 10b. The body section 10a is so formed as to have a polygonal for example, square cross section, and the cylinder 10 therefore is prevented from being swung and therefore can be reliably positioned.

Two blind holes 14 for holding heater elements are formed at the equiangularly, for example, diagonally spaced positions of the base end section 10b of the cylinder 10 in a manner close to and parallel with the respective plastic passageways 12. These holding holes 14 respectively have slits 16 opened to the exterior through the end edge portions of the cylinder corners and extending parallel with the holding holes 14, and therefore are capable of being elastically wide opened.

Cartridge heaters 18 are respectively inserted under pressure into the holding holes 14. Accordingly, the cartridge heaters 18 are not only disposed in a manner close to and parallel with the respective plastic passageways 12 but are also held by the heater holding holes 14 in an always adhesive relation thereto. As a result, a plastic within the plastic passageway 12 can be effectively and uniformly heated by the cartridge heaters 18. Further, a thermocouple 20 is disposed in the base end section 10b so as to control the temperature of the plastic, so that the plastic within the plastic passageway 12 is always permitted to flow in an identical fused condition and is prevented from being solidified.

The slit 16 functions not only to facilitate insertion under pressure of the heater 18 into the holding hole 14 so as to permit the heater 18 to be held by the holding hole 14 in an always adhesive relation thereto as mentioned above, but also to prevent the cylinder 10, even where the heater 18 has been accidentally rapidly thermally expanded, from being destroyed. The slit 16 further functions to facilitate replacement of the heater 18.

Figure 3:
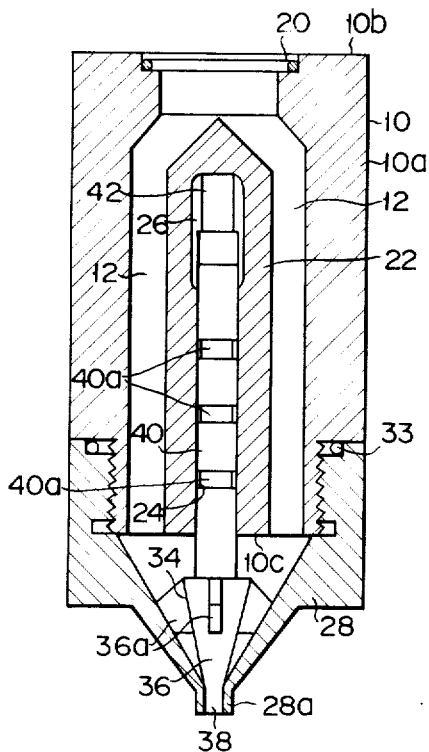

As shown in FIG. 3, the body section 10a of the cylinder 10 is integrally formed with a torpedo 22, which has a central blind hole 24 opened at the tip end section 10c of the cylinder 10. An elongated hole 26 formed through the cylinder body section 10a perpendicularly to the central hole 24 communicates with the central hole 24 at the closed end thereof.

Where, for example, a plurality of said cylinders 10 are operated in a juxtaposed condition, said elongated holes 26 can be utilized in inserting a connection rod (not shown) through said elongated holes so linearly arranged as to operate integrally said plurality of cylinders 10.

Figure 2:
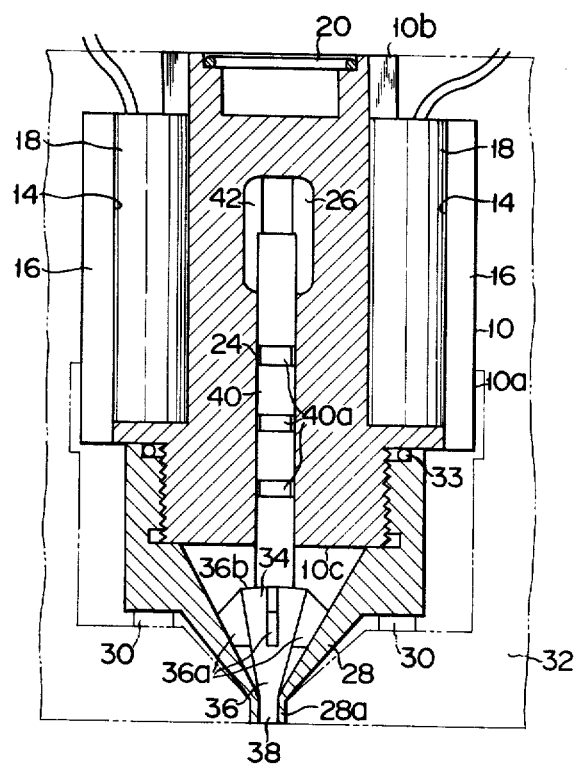
FIGS. 2 and 3 are longitudinal sectional views taken along line II—II and line III—III, respectively, of FIG. 1.

As shown in FIGS. 2 and 3, the tip end section 10c of the cylinder 10 is fitted by screw engagement with a nozzle member 28 having an injection nozzle 28a at the outer end portion. The nozzle member 28 is replaceable with other various nozzle members as required. The nozzle member 28 is formed interiorly with a taper surface whose diameter becomes smaller toward the nozzle 28a. The nozzle member 28 is held by a cavity plate 32 in place through an adiabatic member 30. A reference numeral 33 designates a seal ring for sealing an interspace between the cylinder 10 and the nozzle member 28.

Within the nozzle member 28 is disposed a valve member 34, which is so formed as to have a frustoconical body portion 36 having four blades 36a each formed with an outer taper surface corresponding to the inner taper surface of the nozzle member 28, and column-shaped head portion 38 so integrally formed as to have a diameter large enough to close the injection nozzle 28a of the nozzle member 28. The taper angle of the outer taper surface of the body portion 36 is rendered smaller than that of the inner taper surface of the nozzle member 28. Further, as described later in detail, the large diameter end face 36b of the body portion 36 is slightly tapered, and therefore serves reliably to maintain the opening of the central hole 24 of the torpedo 22 in a fluid-tight condition.

Into the central hole 24 of the torpedo 22 is slidably inserted a pin member 40, which has a lot of small diameter stepped sections 40a equally spaced from one another. These stepped sections 40a serve as a fluid reservoir for preventing the plastic escaped through the sliding face into the central hole from being further carried thereinto. To the projecting end portion of the pin member 40 is connected said valve member 34, which therefore can be moved jointly with the pin member 40. The pin member 40 and valve member 34 constitute valve means, and can of course be formed also in integrity.

Figure 4:
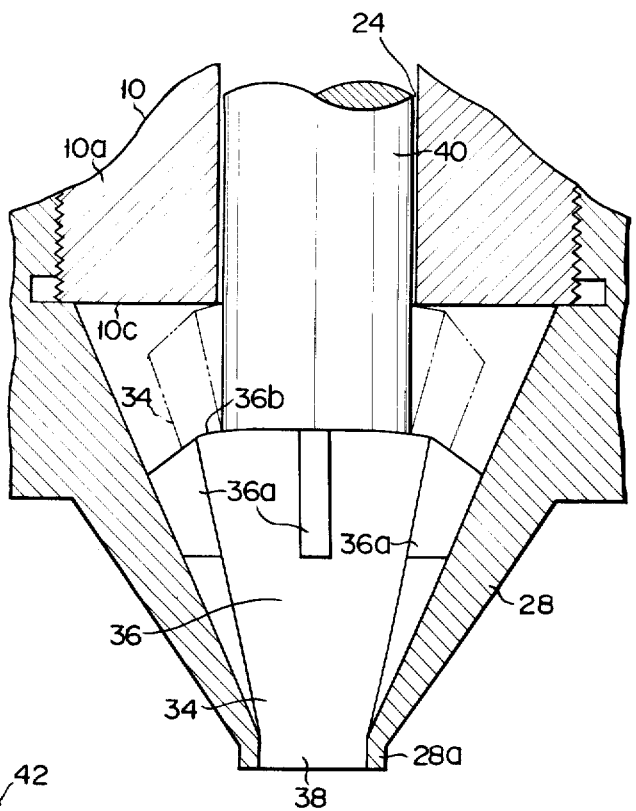
FIG. 4 is an enlarged view illustrating the operation of the valve member.

The valve member 34 is so shaped that when a prescribed level of plastic pressure is applied to the valve member 34, a push force difference can be produced which causes the column-shaped head portion 38 to be spaced from the injection nozzle 28a thereby to release the closed condition. That is to say, the valve member is so formed that the difference between the upward and downward push forces resulting from said prescribed plastic pressure applied to the valve member 34 can become greater than a bias force applied to the valve member 34 by a later described resilient biasing means.

Where the prescribed plastic pressure acts on the valve member 34, the foregoing push force difference is rendered superior to the bias force of the resilient biasing means to cause the column-shaped head portion 38 of the valve member 34 to be separated from the injection nozzle 28a. Accordingly, the fused plastic is injected through the injection nozzle 28a into the cavity (not shown). The large diameter end face 36b of the valve member 34 is so slightly tapered as to maintain the central hole 24 of the cylinder 10 in a fluid-tight condition when the valve member 34 is separated from the injection nozzle 28a to abut against the tip end section 10c of the cylinder 10 as shown by two-dot chain lines of FIG. 4. This tapered end face 36b does not only permit valve member to reliably abut the tip end section 10c but also acts to gradually circumferentially outwardly remove the plastic existing in between the tapered end face and the tip end section 10c. For this reason, the tapered end face 36b is extremely effective in maintaining the central hole 24 in a fluid-tight condition.

Figure 5:
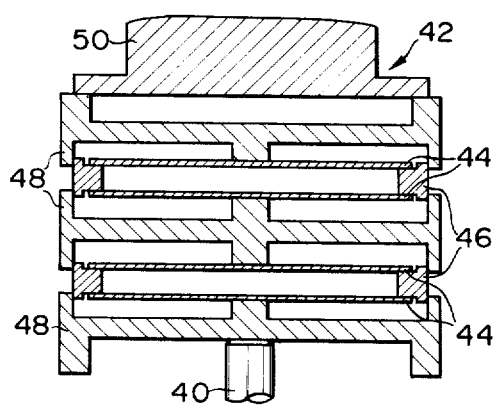
FIG. 5 is a longitudinal sectional view illustrating a preferred example of the resilient biasing means.

A reference numeral 42 indicates the resilient biasing means, a preferred constructive example of which is illustrated in FIG. 5. This resilient biasing means 42 serves, where the plastic pressure is below a prescribed level, to permit the outer taper surface of the blades 36a of the valve member 34 to abut the inner surface of the nozzle member 34 and simultaneously to permit the column-shaped head portion 38 of the valve member 34 to be fitted into the injection nozzle 28a to prevent the plastic injection.

The resilient biasing means 42 is so formed as to permit the bias force thereof to become zero or a value approximate to zero under the closed condition of the injection nozzle 28a for the purpose of preventing the occurrence of fatigue where the injection nozzle 28a is maintained closed by the column-shaped head portion 38. As above described, if the bias force of the resilient biasing means is rendered zero under such closed condition of the injection nozzle 28a, the valve member 34 will be able to be quickly floated upwardly of the illustration, so that the injection operation can with precision be quickly carried out.

Referring to FIG. 5, the resilient biasing means 42 is formed into a leaf spring assembly. Intermediate members 46 are disposed between the end portions of leaf springs 44 arranged in a laminated state. Engagement members 48 abut against the central portions of the respective leaf springs 44. The flange portions at both ends of the two adjacent engagement members 48 position the respective intermediate member 46. When the central portions of the leaf springs 44 have been pressed by the pin member 40 and the engagement members 48, the leaf spring assembly is caused to produce a bias force. The magnitude of the bias force can readily be varied by adjusting the action length of the leaf spring 44 by the intermediate member 46 or by adjusting the number of the leaf spring sheets. A reference numeral 50 denotes a holding member being in abutment with the uppermost engagement member 48.

As above described, the injection unit of the invention is constructed such that the torpedo fixed within the heating cylinder is formed with the central blind hole spaced from and parallel with the plastic passageways; and by the resilient biasing means disposed within said hole the valve member is operated to close the injection nozzle. Accordingly, the present injection unit can make a sufficient and reliable control of the plastic injection in spite of its compact structure.

Further, the injection unit of the invention is suited for application to the hot runner molding, but it will be easily understood that it can be applied also to the injection mechanism of the injection molding machine.

What is claimed is:

1. An injection unit for a hot runner molding comprising a heating cylinder having plastic passageways formed therethrough in the longitudinal direction, a torpedo member having a central blind hole formed therethrough in a manner spaced from and parallel with said plastic passageways of the cylinder and disposed fixed within the cylinder, nozzle means attached to one end of said cylinder at the opening side of the central blind hole of the torpedo member and provided with an injection nozzle communicating with the plastic passageways of the cylinder, said heating cylinder having elastically wide operable blind heater holding holes bored at the other cylinder end in a manner substantially equiangularly spaced from one another, valve means having a slidable pin member disposed within the central hole of the torpedo and a valve member connected to the pin member and disposed within the nozzle means, and resilient biasing means so disposed within the central hole of the torpedo as to bias the pin member thereby causing the injection nozzle of the nozzle means to be closed by the valve member.

2. An injection unit for a hot runner molding as set forth in claim 1 wherein said heating cylinder further has slits respectively communicating between the heater holding holes and the outer surface of said heating cylinder and extending parallel with the heater hole whereby the heater holding hole is rendered elastically wide openable.

3. An injection unit for a hot runner molding as set forth in claim 2 further comprising cartridge heaters respectively detachably fitted into the heater holding holes of the cylinder.

4. An injection unit for a hot runner molding as set forth in claim 2 wherein said cylinder at least partially has a polygonal cross section to prevent rotation about its axis.

5. An injection unit for a hot runner molding as set forth in claim 2 wherein the valve member of said valve means has an end portion connected to said pin member whose diameter is larger than that of the pin member; and said end portion has a taper surface.

6. An injection unit for a hot runner molding as set forth in claim 2 wherein said nozzle means has at its inner wall a taper surface whose diameter becomes smaller toward the injection nozzle, and wherein the valve member of said valve means has engagement portions respectively formed with taper surfaces corresponding to said taper surface of said nozzle means.

7. An injection unit for a hot runner molding as set forth in claim 1 wherein said resilient biasing means has a bias force rendered substantially zero when said valve member closes said injection nozzle; said cylinder has at least partially a polygonal cross section; and said valve means has an end portion connected to said pin member whose diameter is larger than that of the pin member and said end portion has a taper surface.

8. An injection unit for a hot runner molding as set forth in claim 1 wherein said resilient biasing means has a bias force which is rendered substantially zero when the valve member closes the injection nozzle.

* * * * *